United States Patent [19]

Martens

[11] 4,021,116
[45] May 3, 1977

[54] HIGH RESOLUTION DISTANCE MEASURING APPARATUS

[75] Inventor: Alexander E. Martens, Fairport, N.Y.

[73] Assignee: Bausch & Lomb Incorporated, Rochester, N.Y.

[22] Filed: Sept. 2, 1975

[21] Appl. No.: 609,862

[52] U.S. Cl. .................................. 356/4; 356/167; 356/169

[51] Int. Cl.² ......................................... G01C 3/08

[58] Field of Search ................ 250/231 SE, 237 G; 356/4, 167, 169, 170; 324/175

[56] References Cited

UNITED STATES PATENTS

| | | | |
|---|---|---|---|
| 3,388,262 | 6/1968 | Stutz | 356/170 |
| 3,709,611 | 1/1973 | Taisne | 356/170 |
| 3,757,126 | 9/1973 | Tumbush | 250/237 G |
| 3,768,911 | 10/1973 | Erickson | 250/237 G |
| 3,809,895 | 5/1974 | Taisne | 356/169 |

*Primary Examiner*—Maynard R. Wilbur
*Assistant Examiner*—S. C. Buczinski
*Attorney, Agent, or Firm*—Frank C. Parker; Bernard D. Bogdon

[57] ABSTRACT

A high resolution optical electronic measuring device for measuring displacement distance between an object which moves and one which is generally stationary includes apparatus for generating a series of cyclic radiation fringe patterns moving in correspondence with the object being observed and electrical circuitry for processing two correspondingly cyclically generated electrical signals to provide increased measurement resolution by electronically multiplying each division on a measuring scale into eight measurement increments.

4 Claims, 8 Drawing Figures

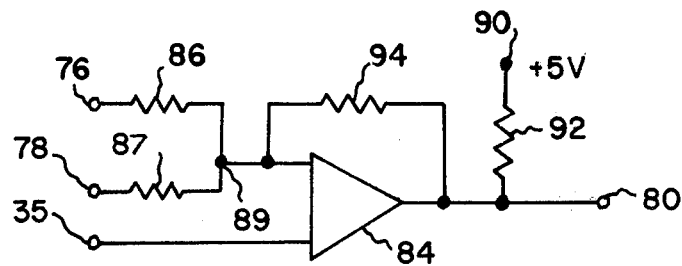
FIG. 2
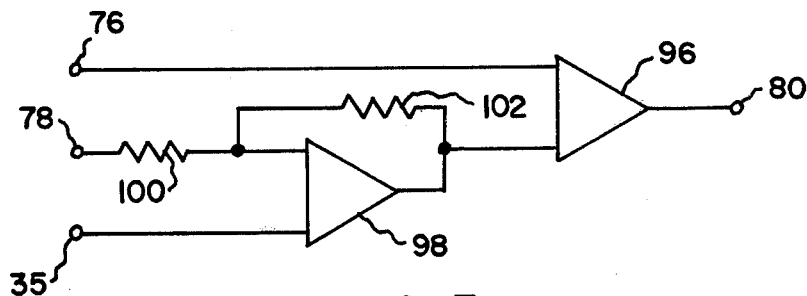
FIG. 3
| EXCLUSIVE OR GATE | | |
|---|---|---|
| INPUT 1 | INPUT 2 | OUTPUT |
| 0 | 0 | 0 |
| 1 | 0 | 1 |
| 0 | 1 | 1 |
| 1 | 1 | 0 |
FIG. 6
| INVERTED RESPONSE | | |
|---|---|---|
| INPUT 1 | INPUT 2 | OUTPUT |
| 0 | 0 | 1 |
| 1 | 0 | 0 |
| 0 | 1 | 0 |
| 1 | 1 | 1 |
FIG. 7

HIGH RESOLUTION DISTANCE MEASURING APPARATUS

BACKGROUND OF THE INVENTION

1. Field of the Invention:

This invention relates to a system for measuring displacement distance between two objects which move relative to each other and, in particular, to a high resolution opto-electronic system for measuring displacement distance with reference to a structure having a ruled scale. The high resolution of measurement is obtained by generating on the opto-electronic system eight pulses corresponding to the displacement for each division of the scale.

2. Brief Description of the Prior Art:

In the field of ultra precise measuring instrumentation, particularly for use with machine tools, transducer systems for measuring displacement of either the tool or the workpiece have long been the subject of attempts to increase measurement resolution and accuracy while controlling the cost to accomplish such results. The approaches to achieve improved results involve such things as reducing the wavelength of the cyclic pattern which is limited, for example, by the fineness of the physical rulings of the gratings. Some attempts have been made to provide unique ruling patterns on gratings which has made their manufacture more difficult and expensive. The incorporation of more detectors, to provide additional signal output information has added additional circuitry and increased the complexity of the electrical system necessary to process the signals.

SUMMARY OF THE INVENTION

To meet the need for an inexpensive measuring system capable of yielding high resolutions, there is provided in accordance with this invention, electrical circuitry capable of producing eight measurement pulses occurring at eight equi-distant divisions of each unit spacing or marked division on a measurement scale. Each complete period of each generated cyclic signal corresponds to a single marked division of the grating or ruled scale. Although it is appreciated that more than two cyclic signals can be utilized in measuring systems, including the one according to the principles of the present invention, the present illustrated and disclosed invention produces increased eight divisional incremental resolution in a measuring system by the process of comparing any two, and only two, quadrature phase cyclic signals to each other, each to a predetermined reference signal, and by identifying when cyclic signals are equal in magnitude. It will be appreciated that the condition of the cyclic signals being equal in magnitude for two cyclic signals in quadrature phase relation to each other occurs four times during a single full period of either signal. Of these occurrences, in two instances the cyclic signals will have the opposite polarity, and in the other two instances the same polarity.

A specific main virtue of the present invention is that it permits the utilization of a simple and inexpensive opto-electronic system to achieve high resolution of measurement by using only two cyclic quadrature electric signals for its operation.

The present invention, for example, provides an inexpensive system yielding a 0.0001 inch resolution for a 1250 lines per inch ruled scale in conjunction with either two or four photodetectors.

BRIEF DESCRIPTION OF THE DRAWINGS

FIG. 2 is a first detailed schematic illustration of the block diagram portion of the embodiment of FIG. 1;

FIG. 3 is a second detailed schematic illustration of the block diagram portion of the embodiment of FIG. 1;

FIG. 6 is a logic or truth table for illustrating the operation of a portion of the apparatus of FIG. 1;

FIG. 7 is a logic or truth table for further illustrating the operation of a portion of the device of FIG. 1.

DETAILED DESCRIPTION OF THE PREFERRED EMBODIMENTS

This patent application disclosure corresponds to and is supported by commonly assigned and concurrently filed and copending patent application disclosure entitled "High Precision Incremental Distance Measuring System" U.S. Application Ser. No. 609,863 for inventor H. Welker, under Bausch & Lomb Incorporated docket designation Welker-7.

Figure 1:
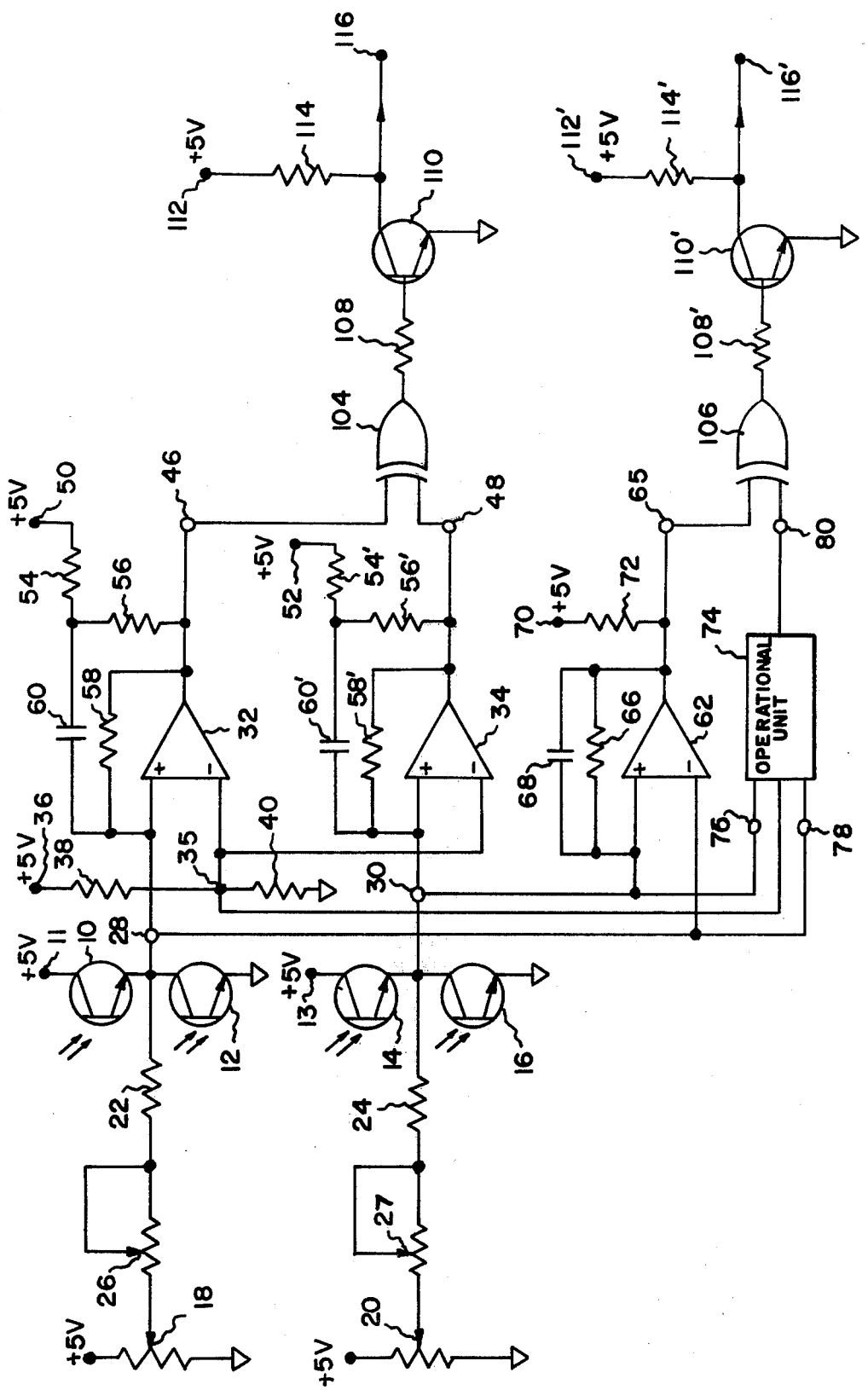
FIG. 1 is a schematic illustration and partial block diagram of a measuring device embodiment according to the principals of the present invention.

In a high resolution measuring device as illustrated in FIG. 1, pairs of phototransistors 10 and 12, and 14 and 16 are interconnected and have a suitable voltage supply connected at terminals 11 and 13, respectively. Each phototransistor responds to, for example, a changing vernier or moire fringe pattern generated as an object being observed moves relative to a generally stationary object. The phototransistors are disposed in any suitable manner well known in the art relative to the measurement scale and corresponding index grating to be alternately illuminated and darkened by the generated moire fringe pattern to generate regular cyclic electrical signals such as those typically illustrated by signal waveforms 17 and 19 of FIGS. 4 and 5. The signals are generally sinusoidal but may be, for example, triangular, sawtooth or trapezoidal. Sinusoidal signal waveform 17 and 19 correspond to M Sin $\omega t$ and M Cos $\omega t$, where M is the peak amplitude and $\omega t$ represents the instant position of the moving object or reading head. The signal trains are displaced by 90°, for example, with respect to each other to provide means for detection of direction. Further, it is to be understood that the use of optical gratings, for example, to produce a cyclic radiation wave or fringe pattern is merely exemplary.

In this high resolution measuring device, variable resistors 18 and 20 are provided to adjust the voltage level of the pairs of phototransistors 10 and 12, and 14 and 16, respectively. In addition, the gain of the photodetection circuitry can be adjusted through respective load resistors 22 and 24 by means of variable resistors 26 and 27, as illustrated in FIG. 1.

Figure 4:
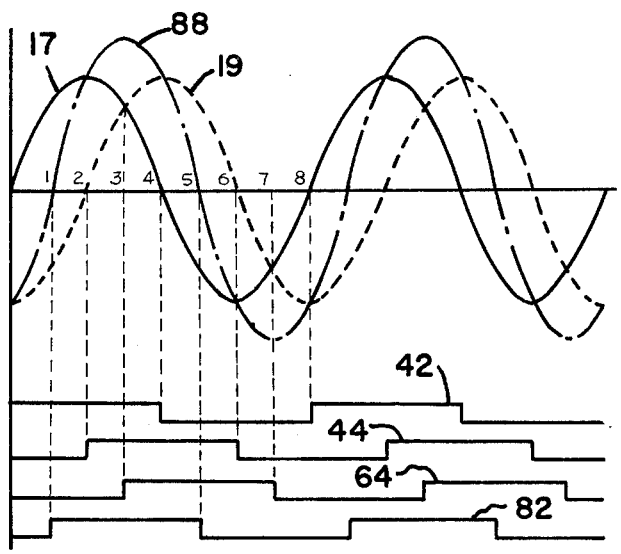
FIG. 4 is a graphic representation of electrical signals generated in the embodiments of the measuring device of FIGS. 1 and 2.

As hereinbefore mentioned, a cyclic signal as illustrated, for example, in FIG. 4 as signal waveform 17 is generated by the photodetection circuitry and is the signal present, for example, at test point 28. Likewise, a similar cyclic signal as illustrated, for example, by signal waveform 19, is in phase quadrature with the cyclic signal represented by signal waveform 17 and is the signal available at test point 30.

Identical comparators 32 and 34 are provided with a common reference voltage at junction 35 of a voltage divider circuit including a voltage source connected at terminal 36 and resistors 38 and 40. The comparators 32 and 34 respectively receive cyclic signals 17 and 19 and generate output signals which are substantially square wave signals and are identified, for example, by signal waveforms 42 and 44 and represent signals which are available at test points 46 and 48, respectively. It will be appreciated that signal shaping compensating circuitry for comparators 32 and 34 is provided and includes voltage power sources connected at terminals 50 and 52 and resistor/capacitor networks, respectively including resistors 54 and 54', resistors 56 and 56', feedback resistors 58 and 58', and capacitors 60 and 60'.

Figure 5:
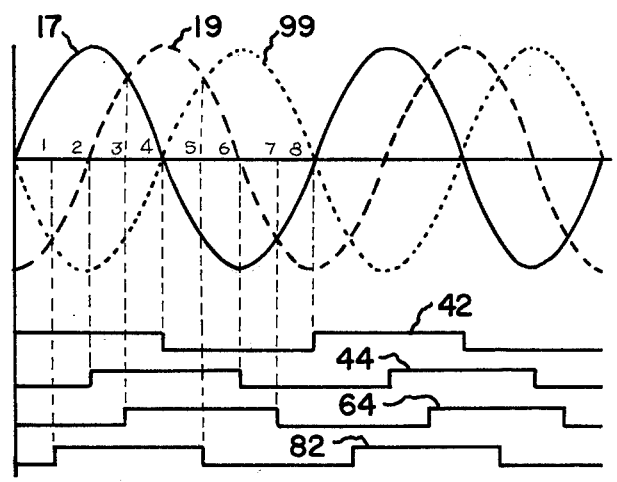
FIG. 5 is a graphic representation of electrical signals generated in the embodiments of the measuring device of FIGS. 1 and 3.

As is evident from the periodic signal waveforms of FIGS. 4 and 5, not only do each of the amplitudes go through zero crossings, or a predetermined set voltage level, which crossings are identified by comparators 32 and 34, but the amplitudes also cross each other. This fact is taken advantage of to increase the resolution of the disclosed inventive system. Thus, the periodic cyclic signals of waveforms 17 and 19 are compared to each other in a comparator 62 to produce a substantially square wave signal such as that illustrated by signal waveform 64 in FIGS. 4 and 5 and available at test point 65. As provided for comparators 32 and 34, compensating circuitry, such as feedback resistor 66 and capacitor 68, is provided to maintain the output as a substantially square wave, and typically there is included a voltage source at terminal 70 with a corresponding load resistor 72, as illustrated in FIG. 1.

To increase resolution capabilities of the measuring device, the periodic cyclic signals of waveforms 17 and 19 are received by an operational unit 74 at input terminal 76 and 78. The particulars of the operational unit 74 are hereinafter described with respect to FIGS. 2 and 3. Unit 74 provides a substantially square wave signal output at test point 80, such as that illustrated by signal waveform 82 in FIGS. 4 and 5.

The illustrated circuit of FIG. 2 is the preferred embodiment for operational unit 74 of FIG. 1 and includes a comparator 84 respectively receiving the signals represented by waveforms 17 and 19 through resistors 86 and 87. The signals of waveform 17 and 19 are additive at junction 89 and are represented by signal waveform 88 in FIG. 4 and represents one input to the comparator 84. Comparator 84 has its second input a voltage at the same level as provided at the second input of comparators 32 and 34, and is respectively connected to the beforementioned voltage divider circuit at junction 35. The output of comparator 84 at output terminal 80 is a substantially square wave signal represented by waveform 82 as illustrated particularly in FIG. 4. It will be appreciated that the voltage source at terminal 90 is typically provided in combination with load resistor 92, and a feedback resistor 94 is provided to control the gain of the comparator 84.

In FIG. 3, an alternate embodiment for the operational unit 74 of FIG. 1 is illustrated. It will be appreciated that terminal 78 of FIG. 3 can receive either cyclic periodic signal waveform 17 or 19, the other cyclic signal being received at terminal 76 of FIG. 3. The periodic signal received at input terminal 76 is applied directly as one input to a comparator 96. The other of the periodic cyclic signals is received by an inverter circuit comprising operational amplifier 98, resistor 100 and feedback resistor 102. If terminal 78 of FIG. 3 is directly connected to test point 28 of FIG. 1, and the signal at this test point is given by the expression M Sin $\omega t$, the inverted signal of waveform 99 of FIG. 5 has values represented by the expression $-M \sin \omega t$. Comparator 96 receives the inverted cyclic signal for comparison with the second and noninverted cyclic signal and has its other input connected to the voltage divider at junction 35. The output of comparator 96 at terminal 80 is substantially a square wave signal as illustrated, for example, by trace 82 of FIG. 5.

The combination of comparators 32, 34, 62 and 84 for the circuits of FIGS. 1 and 2 is ideally suited for realization by integrated circuitry in the form of a quad comparator.

The substantially square waveforms 42, 44, 64 and 82 produced by the hereinbefore described circuitry of FIG. 1 with the embodiment of either FIG. 2 or 3, are then processed through exclusive OR gates 104 and 106. A logic or truth table describing the operation of an exclusive OR gate is illustrated in FIG. 6. For convenience in processing the resultant output signals, two positive inverter circuits are respectively coupled to exclusive OR gates 104 and 106 by current-limiting resistors 108 and 108'. Each of the inverter circuits illustrated in FIG. 1, comprise NPN transistors 110 and 110' connected through load resistors 114 and 114' to a voltage source at terminals 112 and 112'. The inversion process provides trains of measurement counting impulses at test point output terminals 116 and 116'. The logic or truth table in FIG. 7 illustrates the logic of the inversion process.

Figure 8:
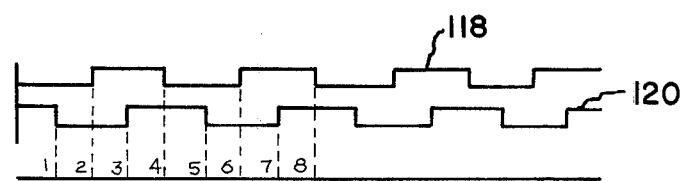
FIG. 8 is a graphic representation of electrical output impulse signals generated in the measuring device of FIG. 1.

FIG. 8 illustrates the output pulse trains 118 and 120 at terminals 116 and 116' and it will be appreciated that in the course of one cycle, for example, of waveform 17 the voltage levels of the waveforms 118 and 120 illustrated in FIG. 8, each change four times, therefore eight times for the combination of the two impulse trains. The occurrence of each one of these eight changes provides a count. Compared to conventional systems, this method provides, by a factor of two, an increase in incremental measurement resolution for each division on the measurement scale.

It will be appreciated that the direction of movement of the object being observed with respect to the stationary object can be detected in any suitable manner as evidenced by the present state of the art.

It is claimed:

1. Apparatus for measuring, as a function of impulse counting, a relative displacement distance value between two objects, comprising:
    photodetection means for generating as a function of relative displacement between the two objects first and second cyclic electrical signals in phase quadrature;
    first comparison means for producing a first substantially square wave signal as a function of a comparison between the first cyclic electrical signal and a predetermined reference signal;

second comparison means for producing a second substantially square wave signal as a function of a comparison between the second cyclic electrical signal and the predetermined reference signal;

third comparison means for generating a third substantially square wave signal as a function of a comparison between the first and second cyclic electrical signals;

operational means for producing a fourth substantially square wave signal as a function of when the first cyclic electrical signal has a value which is equal in magnitude and opposite in sign to the value of the second cyclic electrical signal; and logic means receiving tne first, second, third and fourth substantially square wave signals produced as a function of the first and second cyclic electrical signals to provide an impulse train signal corresponding to the relative displacement distance value between the objects.

2. The apparatus for measuring a relative displacement distance value, as defined in claim 1, wherein the operational means includes an inverter for inverting one of the generated cyclic electrical signals to produce an inverted signal and a comparator for comparing the inverted signal with the other of the cyclic electrical signals to produce the fourth substantially square wave signal.

3. The apparatus for measuring a relative displacement distance value, as defined in claim 1, wherein the operational means includes means for summing the first and the second cyclic electrical signals to provide a summation signal and comparison means for producing the fourth substantially square wave signal as a function of a comparison between the summation signal and the predetermined reference signal.

4. The apparatus for measuring a relative displacement distance value, as defined in claim 1, wherein the logic means includes an exclusive OR gate to provide an impulse train signal corresponding to the displacement distance value between the objects as a function of the first, second, third and fourth substantially square wave signals.

* * * * *